United States Patent
Taniguchi et al.

(10) Patent No.: US 12,059,981 B2
(45) Date of Patent: Aug. 13, 2024

(54) SEAT SLIDING DEVICE AND ASSEMBLING METHOD OF LOCK SPRING USED IN SEAT SLIDING DEVICE

(71) Applicants: TOYOTA BOSHOKU KABUSHIKI KAISHA, Kariya (JP); TACHI-S CO., LTD., Tokyo (JP); TF-METAL Co., Ltd., Kosai (JP)

(72) Inventors: Kosuke Taniguchi, Nagoya (JP); Shunsuke Kuroda, Kikugawa (JP)

(73) Assignees: TOYOTA BOSHOKU KABUSHIKI KAISHA, Kariya (JP); TACHI-S CO., LTD., Tokyo (JP); TF-METAL CO., LTD., Kosai (JP)

( * ) Notice: Subject to any disclaimer, the term of this patent is extended or adjusted under 35 U.S.C. 154(b) by 368 days.

(21) Appl. No.: 17/672,929

(22) Filed: Feb. 16, 2022

(65) Prior Publication Data

US 2022/0266727 A1   Aug. 25, 2022

(30) Foreign Application Priority Data

Feb. 19, 2021   (JP) .................................. 2021-024756

(51) Int. Cl.
*B60N 2/07* (2006.01)
*B60N 2/08* (2006.01)

(52) U.S. Cl.
CPC ......... *B60N 2/0875* (2013.01); *B60N 2/0705* (2013.01); *B60N 2/0818* (2013.01)

(58) Field of Classification Search
CPC ...... B60N 2/07; B60N 2/0735; B60N 2/0881; B60N 2/0862; B60N 2/0831; B60N 2/0825; B60N 2/0806; B60N 2/01583; B60N 2/01525; B60N 2/0875; B60N 2/0705; B60N 2/0818; B60N 2/08

USPC ............................................ 296/65.13, 65.14
See application file for complete search history.

(56) References Cited

U.S. PATENT DOCUMENTS

| | | | |
|---|---|---|---|
| 9,283,870 B2 * | 3/2016 | Yamada | B60N 2/0875 |
| 2014/0110552 A1 * | 4/2014 | Yamada | B60N 2/0705 |
| | | | 248/429 |
| 2015/0069202 A1 | 3/2015 | Hayashi | |
| 2016/0221477 A1 * | 8/2016 | Satoh | B60N 2/0715 |
| 2017/0036568 A1 * | 2/2017 | Kumagai | B60N 2/0806 |

(Continued)

FOREIGN PATENT DOCUMENTS

| CN | 104245411 A | 12/2014 |
|---|---|---|
| JP | 2020-117133 A | 8/2020 |

OTHER PUBLICATIONS

Office Action issued in corresponding Chinese Patent Application No. 202210163363.1, with English Machine Translation, dated Mar. 29, 2023 (19 pages).

*Primary Examiner* — Gregory A Blankenship
(74) *Attorney, Agent, or Firm* — Foley & Lardner LLP

(57) ABSTRACT

A seat sliding device includes: a lower rail; an upper rail; a lock member; a spring member; and an operation lever, the first fixing portion of the spring member which has a ring shape having an outside diameter greater than a width between the pair of the side walls of the upper rail, which has a spring force in a diameter increasing direction between the pair of the side walls of the upper rail, and which includes a first mounting portion and a second mounting portion that are configured to be mounted and fixed, respectively, in the first hole portion and the second hole portion by the spring force.

12 Claims, 9 Drawing Sheets

(56) References Cited

U.S. PATENT DOCUMENTS

| | | | | |
|---|---|---|---|---|
| 2017/0341535 A1* | 11/2017 | Taniguchi | ............ | B60N 2/0875 |
| 2018/0222354 A1* | 8/2018 | Hoshihara | ............ | B60N 2/0875 |
| 2018/0304778 A1* | 10/2018 | Matsufuji | ............ | B60N 2/0843 |
| 2019/0225119 A1* | 7/2019 | Nishio | ................ | B60N 2/0722 |
| 2019/0270393 A1* | 9/2019 | Taniguchi | .............. | B60N 2/085 |
| 2020/0189424 A1* | 6/2020 | Kuroda | ................ | B60N 2/0875 |
| 2020/0238859 A1* | 7/2020 | Taniguchi | ............ | B60N 2/0818 |
| 2020/0238861 A1 | 7/2020 | Taniguchi | | |
| 2022/0266726 A1* | 8/2022 | Taniguchi | .............. | B60N 2/085 |
| 2022/0266727 A1* | 8/2022 | Taniguchi | ............ | B60N 2/0818 |
| 2023/0256872 A1* | 8/2023 | Kuroda | ................ | B60N 2/0715 |
| | | | | 248/429 |

* cited by examiner

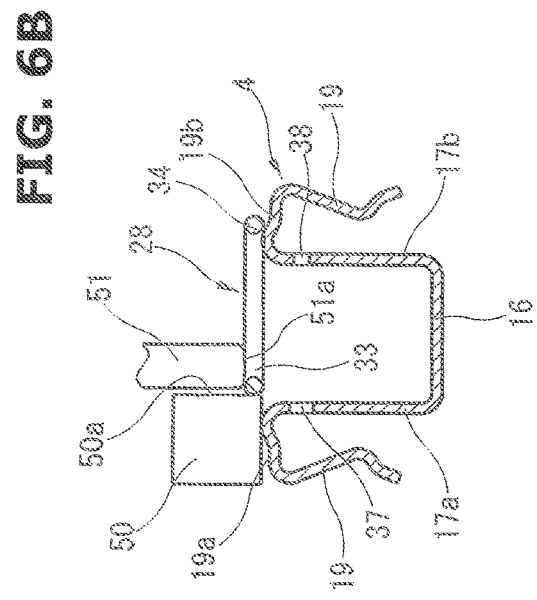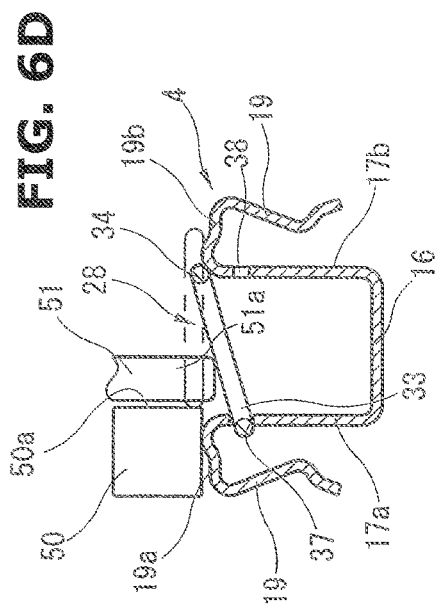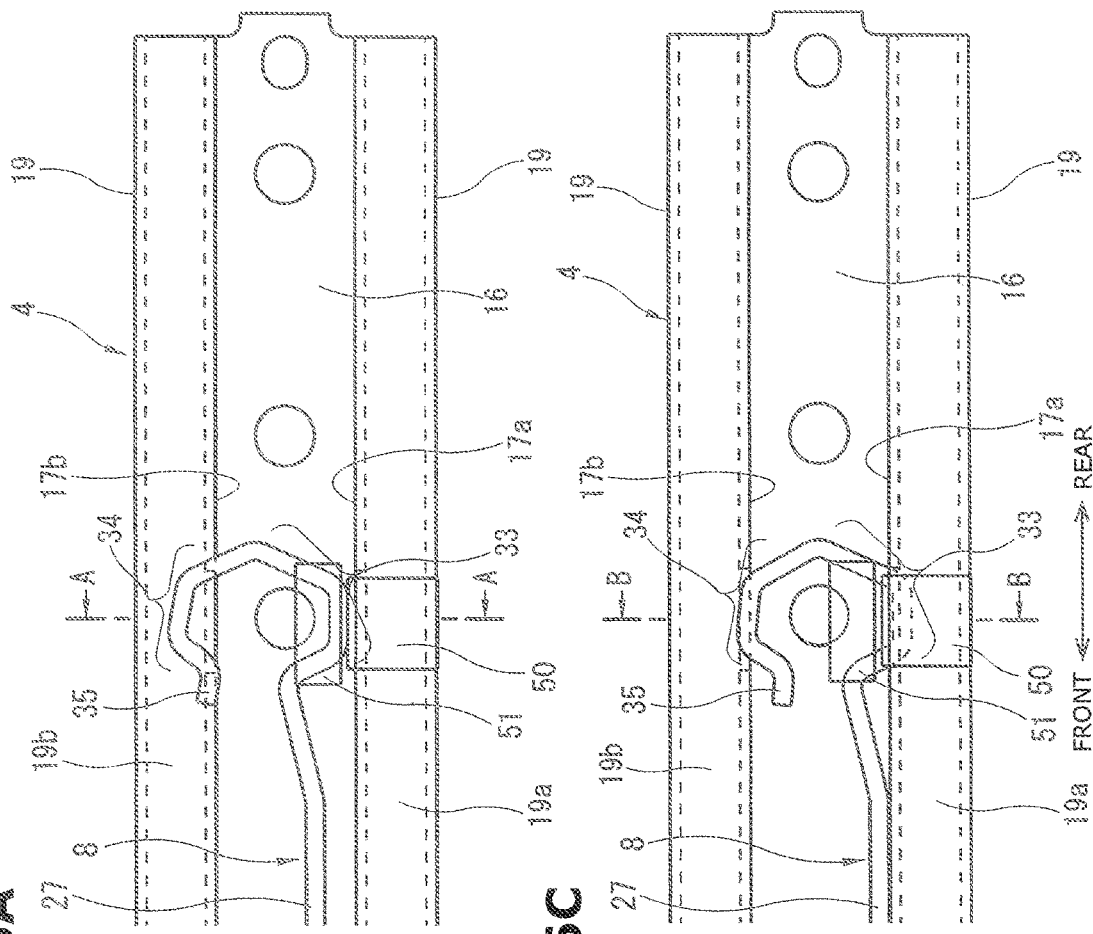

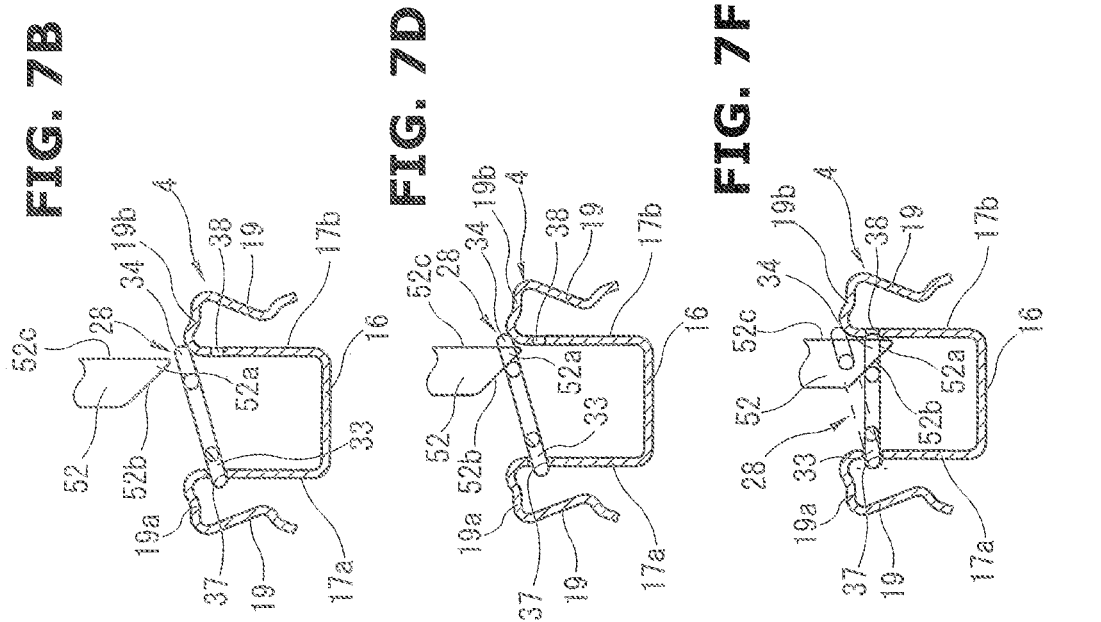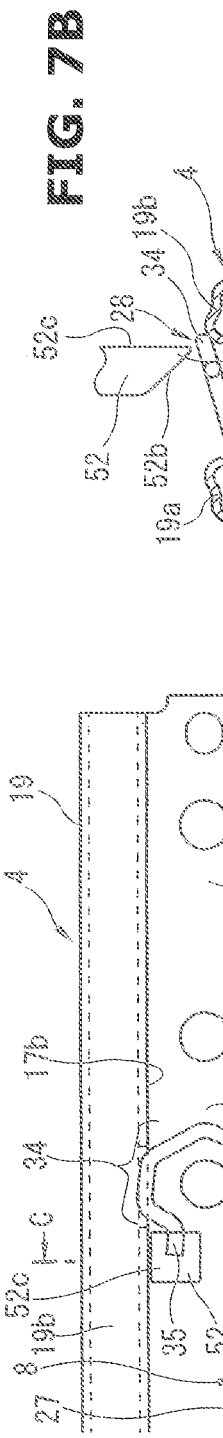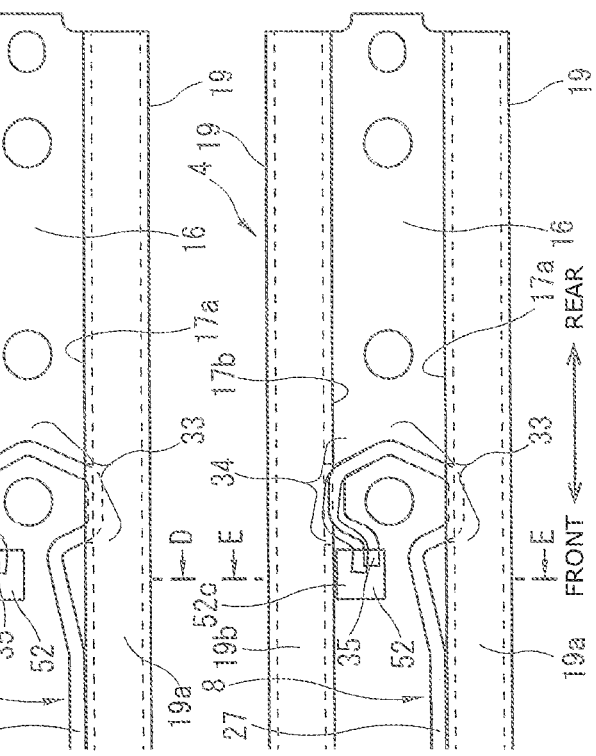

SEAT SLIDING DEVICE AND ASSEMBLING METHOD OF LOCK SPRING USED IN SEAT SLIDING DEVICE

BACKGROUND OF THE INVENTION

The present invention relates to a seat sliding device and an assembling method of a lock spring used in the seat sliding device.

Japanese Patent Application Publication No. 2020-117133 (corresponding to U.S. Patent Application Publication No. 2020/238861 A1) discloses a seat sliding device mounted in a vehicle and so on.

This seat sliding device includes fixing rails fixed to a floor surface of a vehicle; movable rails slidably mounted to the fixing rail; and a lock mechanism configured to fix the movable rails at an arbitrary position of the fixing rails. A lock plate of the lock mechanism is configured to be urged by a spring member in a direction in which the movable member is fixed to the fixing rail by the spring member.

An operation lever is configured to be operated in a release direction (for example, pull-up direction) against the urging force of the spring member, and thereby to raise the lock plate to release the fixing of the movable rail with respect to the fixing rail.

The spring member is formed by bending one metal wire. The spring member is disposed inside the movable member along the longitudinal direction. The lock plate is retained at a middle portion of the spring member. A front end portion and a rear end portion of the spring member in the forward and rearward directions are fixed to the movable rail. That is, the front end portion of the spring member is bent in a return shape. A portion of the front end portion of the spring member is mounted and fixed in a hole portion formed in a first side wall of the movable rail. On the other hand, the rear end portion is bent in a three-dimensional manner. An angular portion which is bent into an L-shaped taper portion, and which is provided to a taper portion provided to a first spring portion is mounted in a hole portion provided in a second side wall of the movable rail. A seat portion of the tip end portion is elastically abutted and fixed on an inner surface of the first side wall of the movable rail from the inside.

SUMMARY OF THE INVENTION

In the above-described seat sliding device, the angular portion of the tapered portion which is a fixing means of the rear end portion of the spring member is mounted and fixed in the hole portion of the movable rail. However, the seat portion of the tip end portion is merely elastically abutted on the inner surface of the first side wall to be a free state. Accordingly, the upward and downward position of the seat portion is easy to be varied. Accordingly, the posture of the overall spring member is not stabilized, so that the stable urging force may not provide to the lock plate.

Moreover, there are provided first support portions configured to support intermediate portions of the first spring portion of the spring member to elastically deform the first spring portions in an arc shape for increasing the urging force of the spring member in the lock direction. Accordingly, an assembling operation is complicated so that the operation efficiency is deteriorated.

It is, therefore, an object of the present invention to provide a seat sliding device devised to solve the above-described problems, to attain a stable urging force to a lock plate by ensuring a stable overall posture of a lock spring after the assembling operation, and an assembling method of the lock spring used in this seat sliding device.

According to one aspect of the present invention, a seat sliding device comprises: a lower rail disposed and fixed on a floor surface of a vehicle along frontward and rearward directions of the vehicle; an upper rail which includes a pair of side walls, which is mounted to be slid with respect to the lower rail along a longitudinal direction of the lower rail, and to which a seat is mounted; a lock member configured to be moved in upward and downward directions of a longitudinal direction of the upper rail between a lock position at which the sliding movement of the upper rail with respect to the lower rail is locked, and a lock release position at which the sliding movement of the upper rail with respect to the lower rail can be performed; a spring member disposed inside the upper rail to extend in the longitudinal direction of the upper rail, the spring member including; a first fixing portion and a second fixing portion provided at both ends of the spring member, and retained to the upper rail, an attaching portion which is provided at an intermediate portion of the spring member, and to which the lock member is retained, a first spring portion positioned between the first fixing portion and the attaching portion, and configured to urge the lock member in a lock direction; and a second spring portion positioned between the second fixing portion and the attaching portion, and configured to urge the lock member in the lock direction; and an operation lever configured to push the lock member against an urging force of the spring member, and thereby to release the lock of the upper rail, the upper rail includes a pair of left and right side walls which are a first side wall and a second side wall, and a first hole portion and a second hole portion which are formed, respectively, in the first and second side walls, and each of which extends in the longitudinal direction of the upper rail to be overlapped with each other in the longitudinal direction and upward and downward directions of the upper rail, and the first fixing portion of the spring member which has a ring shape having an outside diameter greater than a width between the pair of the side walls of the upper rail, which has a spring force in a diameter increasing direction between the pair of the side walls of the upper rail, and which includes a first mounting portion and a second mounting portion that are configured to be mounted and fixed, respectively, in the first hole portion and the second hole portion by the spring force.

According to another aspect of the invention, an assembling method of a spring member used in a seat sliding device including a lower rail disposed and fixed on a floor surface of a vehicle along frontward and rearward directions of the vehicle; an upper rail which includes a pair of side walls, which is mounted to be slid with respect to the lower rail along a longitudinal direction of the lower rail, and to which a seat is mounted; a lock member configured to be moved in upward and downward directions of a longitudinal direction of the upper rail between a lock position at which the sliding movement of the upper rail with respect to the lower rail is locked, and a lock release position at which the sliding movement of the upper rail with respect to the lower rail can be performed; a spring member disposed inside the upper rail to extend in the longitudinal direction of the upper rail, the spring member including; a first fixing portion and a second fixing portion provided at both ends of the spring member, and retained to the upper rail, an attaching portion which is provided at an intermediate portion of the spring member, and to which the lock member is retained, a first spring portion positioned between the first fixing portion and the attaching portion, and configured to urge the lock member in a lock direction; and a second spring portion positioned between the second fixing portion and the attaching portion, and configured to urge the lock member in the lock direction; and an operation lever configured to push the lock member against an urging force of the spring member, and thereby to release the lock of the upper rail, the upper rail includes a pair of left and right side walls which are a first side wall and a second side wall, and a first hole portion and a second hole portion which are formed, respectively, in the first and second side walls, and each of which extends in the longitudinal direction of the upper rail to be overlapped with each other in the longitudinal direction and upward and downward directions of the upper rail, and the first fixing portion of the spring member which has a ring shape having an outside diameter greater than a width between the pair of the side walls of the upper rail, which has a spring force in a diameter increasing direction between the pair of the side walls of the upper rail, and which includes a first mounting portion and a second mounting portion that are configured to be mounted and fixed, respectively, in the first hole portion and the second hole portion by the spring force, the assembling method comprises: a first process of retaining the attaching portion of the spring member to the lock member disposed at the lock position with respect to the upper rail, and positioning the first fixing portion of the spring member outside an opening end side with respect to the first and second side walls of the upper rail including the first hole portion and the second hole portion in the upward and downward directions of the upper rail; a second process of moving the first mounting portion in a direction of the first hole portion along the first side wall of the upper rail in a state in which the second mounting portion is disposed outside the second side wall of the upper rail, and mounting a portion of the first mounting portion in the first hole portion; and a third process of moving the second mounting portion along an inner surface of the second side wall of the upper rail while elastically deforming the second mounting portion of the fixing portion toward the first mounting portion, and mounting a portion of the second mounting portion in the second hole portion.

BRIEF DESCRIPTION OF THE DRAWINGS

FIG. 5A is a schematic view showing a shape of the first hole portion, and an initial state in which a portion of the first mounting portion of the fixing portion is mounted in the first hole portion. FIG. 5B is a schematic view showing a state in which the portion of the first mounting hole is finally fixed in the first hole portion. FIG. 5C is a schematic view showing a shape of the second hole portion, and a state in which a portion of the second mounting portion of the fixing portion is fixed in the second hole portion.

FIGS. 6A-6D show a fixing process for mounting and fixing the first mounting portion of the fixing portion of the spring member to the first hole portion. FIG. 6A shows an initial state in which the first mounting portion is fixed to the first hole portion by using the jig. FIG. 6B is a sectional view taken along a section line A-A of FIG. 6A.

FIG. 6C shows a state in which the first mounting portion is mounted in the first hole portion by using the jig. FIG. 6D is a sectional view taken along a section line B-B of FIG. 6C.

FIGS. 7A-7F show a fixing process for mounting and fixing the second mounting portion of the fixing portion to the second hole portion. FIG. 7A shows an initial state in which the second mounting portion is mounted to the second hole portion by using the jig. FIG. 7B is a sectional view taken along a section line C-C of FIG. 7A. FIG. 7C shows a state in which the second mounting portion is pushed and inserted into the second hole by using the jig. FIG. 7D is a sectional view taken along a D-D line of FIG. 7C. FIG. 7E shows a state in which the second mounting portion is mounted in the second hole portion. FIG. 7F is a sectional view taken along a section line E-E of FIG. 7E.

DETAILED DESCRIPTION OF THE INVENTION

Hereinafter, a seat sliding device according to an embodiment of the present invention, and an assembling method of a lock spring used in the seat sliding device are explained with reference to the drawings.

Figure 1:
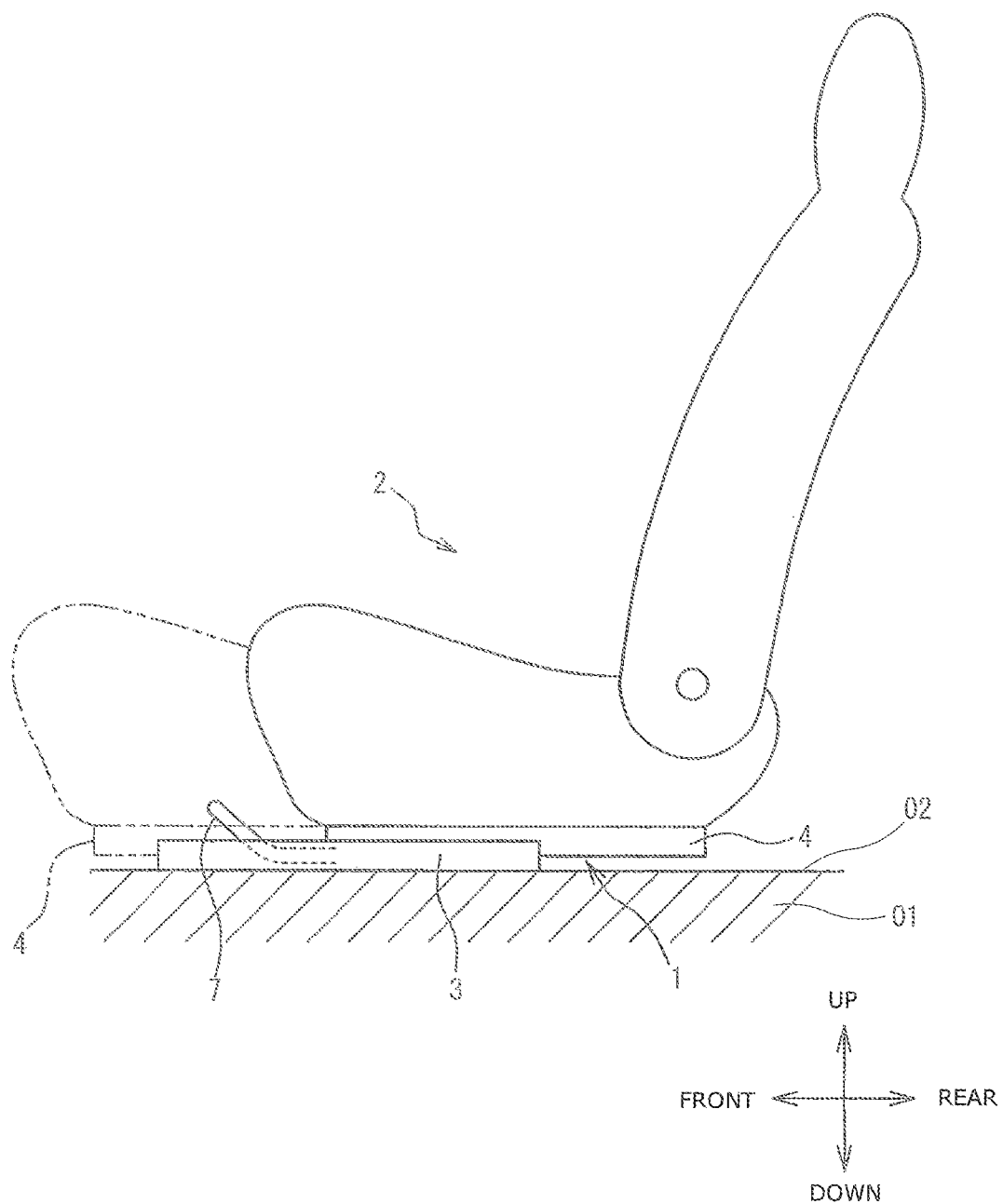
FIG. 1 is an explanation view showing one example of a seat to which a seat sliding device according to the present invention is mounted.
Figure 2:
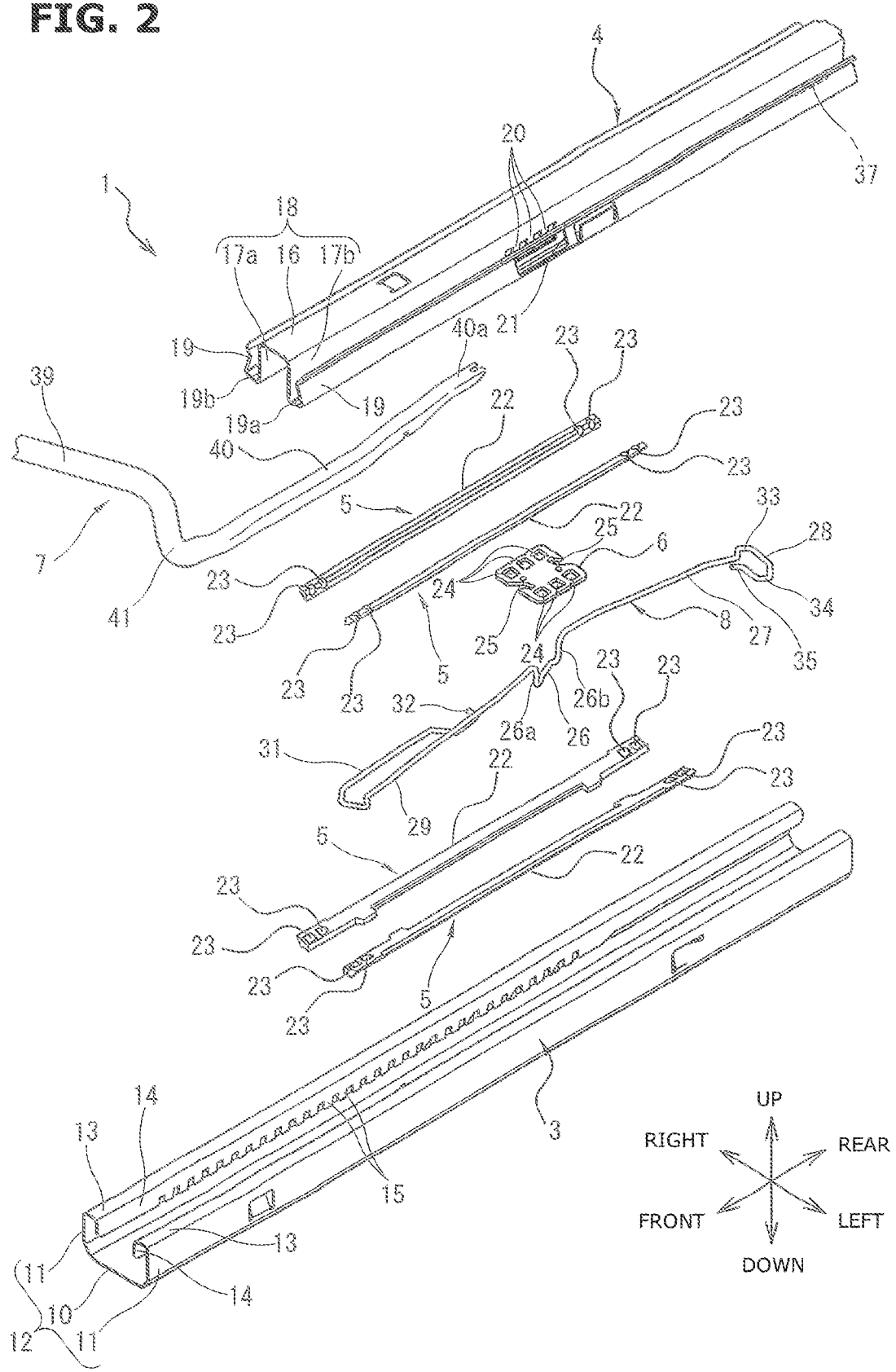
FIG. 2 is an exploded perspective view showing the seat sliding device according to the present invention.
Figure 3:
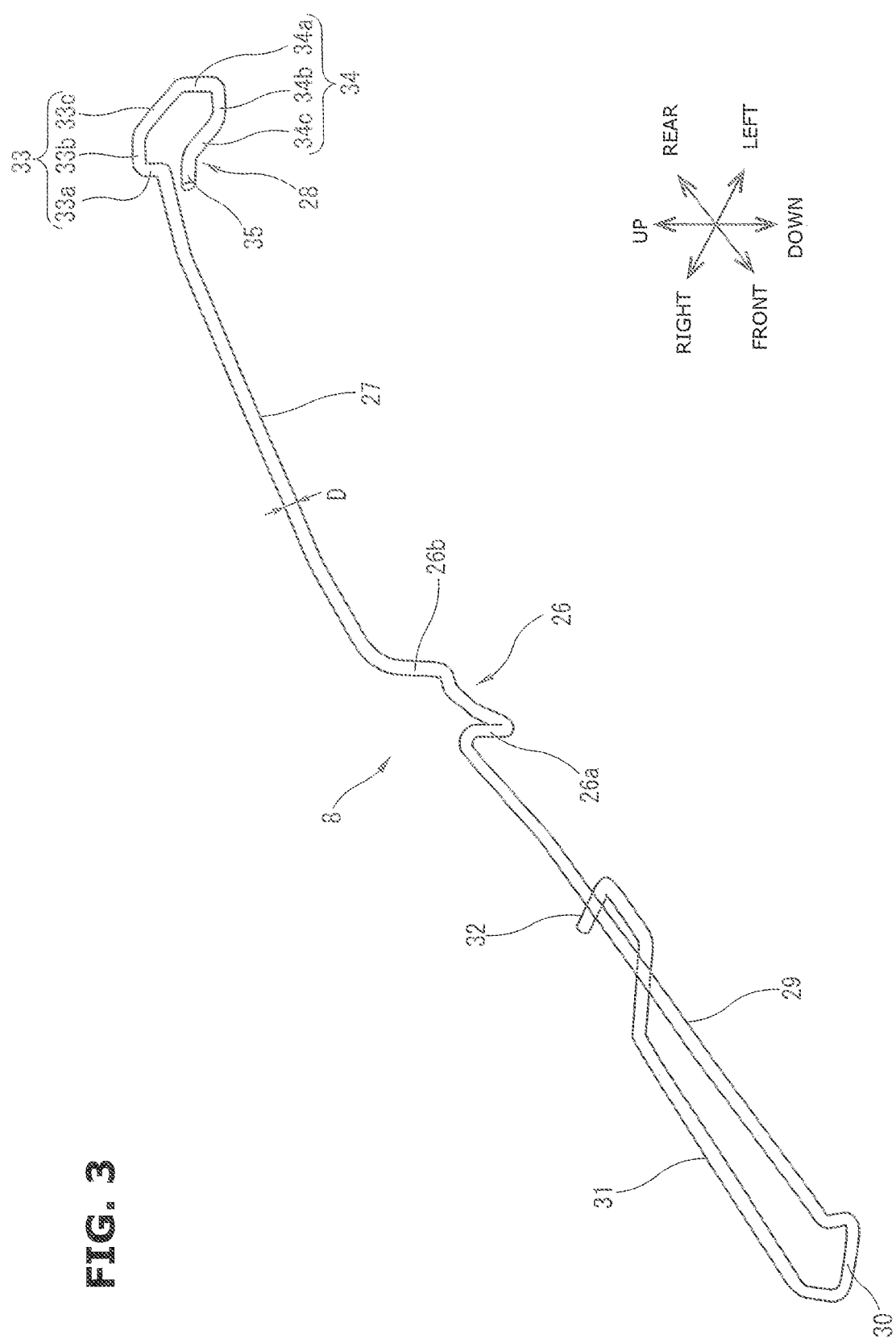
FIG. 3 is a perspective view showing a spring member which is a lock spring used in the seat sliding device according to the present invention.
Figure 4:
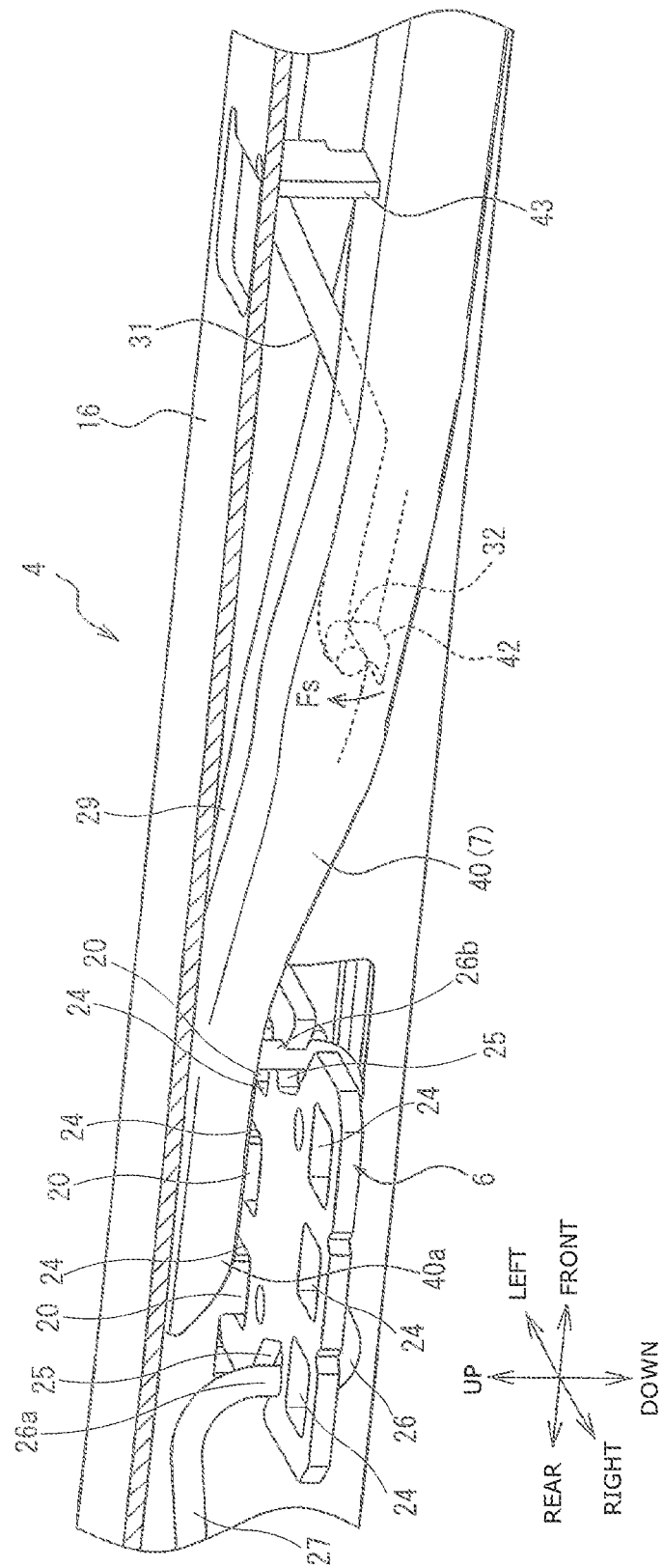
FIG. 4 is an explanation view schematically showing a relationship among the spring member, an upper rail, a lock member, and an operation handle in the seat sliding device 1 according to the present invention.

FIG. 1 is an explanation view schematically showing a state in which a seat sliding device 1 according to the present invention is mounted to a seat 2 of a vehicle. FIG. 2 is an exploded perspective view showing the seat sliding device 1 according to the present invention. FIG. 3 is a perspective view showing a spring member 8 which is a lock spring used in the seat sliding device 1 according to the present invention. FIG. 4 is an explanation view schematically showing a relationship among the spring member 8, an upper rail 4, a lock member 6, and an operation handle 7 in the seat sliding device 1 according to the present invention.

Besides, "upward and downward directions" in the specification are upward and downward directions in a state in which the seat sliding device 1 is fixed to a floor surface of the vehicle. The "upward and downward directions" are a direction perpendicular to the floor surface of the vehicle, that is, a height direction of the vehicle. Moreover, "forward and rearward directions" in the specification are forward and rearward directions of the vehicle in the state which the seat sliding device 1 is fixed to the floor surface of the vehicle. For example, the "forward and rearward directions" correspond to left and right directions in FIG. 1 and FIG. 3 (left sides in FIG. 1 and FIG. 3 are the forward direction).

In FIG. 1 and FIG. 2, the above-described upward and downward directions and the above-described forward and rearward directions are shown by arrows. In FIG. 2 to FIG. 4, widthwise directions of the vehicle is shown by arrows in addition to the above-described upward and downward directions and the above-described forward and rearward directions.

As shown in FIG. 1, the seat sliding device 1 is mounted to a lower portion of a seat 2. The seat sliding device 1 is fixed on a floor surface 02 of a vehicle body 01.

That is, as shown in FIG. 1 and FIG. 2, the seat sliding device 1 includes a lower rail 3 which is made of metal, and which is fixed on the floor surface 02 of the vehicle along the forward and rearward directions of the vehicle; an upper rail 4 which is made of the metal, and which is mounted to be slid with respect to the lower rail 3 along a longitudinal direction of the lower rail; plural pairs of sliding guide members 5 and 5 configured to decrease frictional resistance when the upper rail 4 is slid within the lower rail 3; a lock member 6 which is made of the metal, and which is configured to fix (lock) the upper rail 4 at an arbitrary position with respect to the lower rail 3; an operation handle 7 which is made of the metal, and which configured to release the lock of the lock member 6 by an operation in a lock release direction; and a spring member 8 which is a lock spring that is an urging member configured to urge the operation handle 7 and the lock member 6 in a direction in which the upper rail 4 is fixed to the lower rail 3.

The lower rail 3 is formed by bending steel plate made of, for example, high tensile steel. The upper rail 4 is formed by bending the steel plate made of, for example, the high tensile steel. The lock member 6 is formed by machining the steel plate. The operation handle 7 is formed by pressing and bending a cylindrical member made of, for example, steel pipe, and so on. The spring member 8 is formed by elastic metal wire.

A pair of left and right assemblies each obtained by assembling the upper rail 4, the lock member 6, and so on to the lower rail 3 are disposed between the seat 2 and the floor surface, in parallel with each other along the forward and rearward directions of the vehicle. The pair of assemblies are linked by one operation handle 7. That is, the lower rails 3 and the upper rails 4 of the pair of assemblies are locked by the respective lock members 6. These locks can be simultaneously released by the operation handle 7.

Hereinafter, one of the pair of left and right assemblies is explained for convenience.

As shown in FIG. 1 and FIG. 2, the lower rail 3 includes a lower rail main body portion 12 which includes a lower rail bottom wall 10 confronting the floor surface 02 of the vehicle body 01, and a pair of lower rail outer side walls 11 risen from both end edges of the lower rail bottom wall 10 in the widthwise direction, which is opened in an upper portion, and which has a U-shaped section; a pair of lower rail upper walls 13 each inwardly extending in a horizontal direction from a tip end of the lower rail outer side wall 10; and a pair of lower rail inner side walls 14 each of which is bent in a return shape from a tip end of the lower rail upper wall 13 toward the lower rail bottom wall 10, and which extends from the tip end of the lower rail upper wall 13 toward the lower rail bottom wall 10.

Each of the lower rail inner side walls 14 includes lower rail lock teeth 15 formed at a lower portion of the each of the lower rail inner side walls 14. Each of the lock teeth 15 includes a plurality of teeth formed in a comb teeth shape on the lower rail inner side wall 14 in the longitudinal direction of the lower rail. For example, each of the lower rail lock teeth 15 is formed in a range from a front end position of the lower rail 3 to a substantially central position of the lower rail 3.

Besides, a distance between the pair of the lower rail inner side walls 14 confronting each other is set so that the upper rail 4 received within the lower rail 3 can be slid.

As shown in FIG. 2, the upper rail 4 includes an upper rail main body portion 18 which includes an upper rail top wall 16, and a pair of upper rail side walls 17a and 17b on the both sides of the upper rail top wall 16, which is opened in a lower portion, and which has an inverted U-shaped section; and a pair of upper rail bent walls 19 each of which is outwardly bent from a lower end of the upper rail side wall 17a or 17b, and which extends in the upward direction.

The upper rail top wall 16 is fixed to a side bracket (not shown) provided at the lower portion of the seat 2 by a bolt (not shown) and so on. That is, the seat 2 is mounted to the upper rail 4.

Each of the upper rail side walls 17a and 17b includes upper rail lock teeth 20 having a number corresponding to a number of a lock holes 24 (described later) of the lock member 6. Each of the upper rail lock teeth 20 has a plurality of teeth formed at a substantially central position of the each of the upper rail side walls 17a and 17b in the longitudinal direction of the upper rail at a regular interval in the longitudinal direction of the upper rail.

Each of the upper rail bent walls 19 includes a lower end wall 19a integrally connected with one of the upper rail side walls 17. This lower end wall 19a extends in the longitudinal direction of the upper rail 4. Moreover, a tip end portion of the upper rail bent wall 19 outwardly extending from the lower end wall 19a is inserted between the lower rail outer side wall 11 and the lower rail inner side wall 14 when the upper rail 4 is assembled to the lower rail 3. At the same time, the lower rail inner side wall 14 is inserted between the upper rail bent wall 19 and the upper rail side wall 17.

Each of the upper rail bent wall 19 includes an opening portion 21 formed at a substantially central position in the longitudinal direction of the upper rail. The opening portion 21 is formed into a rectangular shape along the longitudinal direction of the upper rail. The opening portion 21 is formed at a position at which the opening portion 21 is overlapped with the upper rail lock teeth 20.

As shown in FIG. 2, each of the sliding guide members 5 includes a rod-shaped retainer 22; and two pairs steel balls 23 each of which includes two steel balls, and each of which are rotatably held at front and rear ends of the retainer 22.

The sliding guide members 5 are disposed between the lower rail outer side walls 11 and the upper rail bent walls 19. Four sliding guide members 5 are disposed at upper left and right positions and lower left and right positions.

Each of the sliding guide members 5 is configured to decrease the frictional resistance when the upper rail 4 is moved within the lower rail 3 so that the upper rail 4 is configured to be smoothly slid with respect to the lower rail 3.

As shown in FIG. 2 and FIG. 4, the lock member 6 is made from a rectangular metal plate. The lock member 6 includes a plurality of lock holes 24 formed and arranged on both sides of the lock member 6. The lock member 6 includes a pair of retaining holes 25 formed at a central position of a front end edge, and at a central position of a rear end edge. Each of the retaining holes 25 is cut into an inclined shape. A pair of rising portion 26a and 26b which are formed at front and rear ends of a first attaching portion 26 (described later) of the spring member 8 are mounted and retained in the retaining holes 25 from the lower side. With this, the lock member 6 is mounted and fixed to the first attaching portion 26.

The lock member 6 is mounted to the above-described first attaching portion 26 of the spring member 8. The lock member 6 is disposed at a substantially central position of the upper rail 4 in the longitudinal direction of the upper rail.

The lock member 6 is configured to be moved in the upward and downward directions perpendicular to the longitudinal direction of the upper rail, to maintain a lock position at which the lower rail lock teeth 15 and the upper rail lock teeth 20 are inserted into the lock holes 24 by the spring force of the spring member 8 in the upward direction, and thereby to attain the lock state in which the upper rail 4 is locked on the lower rail 3. In this lock state, the sliding movement of the upper rail 4 with respect to the lower rail 3 is prohibited. The lock member 6 is configured to attain a unlock state in which the upper rail 4 is not fixed on the lower rail 3 when the lower rail lock teeth 15 and the upper rail lock teeth 20 are released from the lock holes 24 against the spring force of the spring member 8. In this unlock state, the sliding movement of the upper rail 4 with respect to the lower rail 3 is permitted.

As shown in FIG. 2 and FIG. 3, the spring member 8 is formed, for example, by bending a metal wire. The spring member 8 has a diameter D which is a substantially constant spring diameter over an overall length. The spring member 8 includes front and rear end portions in the longitudinal direction. The front and rear end portions of the spring member 8 are fixed to the upper rail 4.

As shown in FIG. 3, the spring member 8 includes the first attaching portion 26 which is formed at a substantially central position, and to which the lock member 6 is mounted; a first spring portion 27 extending from the first attaching portion 26 in the rearward direction of the vehicle; a rear end fixing portion 28 which has a ring shape, and which is connected to a rear end of the first spring portion 27; a second spring portion 29 extending from the first attaching portion 26 in the forward direction of the vehicle; a front end fixing portion 30 which is a front end portion of the spring member 8, and which is connected to a front end of the second spring portion 29; a third spring portion 31 which is bent in a return shape from the front end fixing portion 30 in the rearward direction of the vehicle; and a second attaching portion 32 which is connected to a rear end of the third spring portion 31, and which is bent into a substantially perpendicular shape.

The first attaching portion 26 is positioned at a substantially central position of the spring member 8 in the longitudinal direction. The first attaching portion 26 is disposed to support the lower surface side of the lock member 6. The first attaching portion 26 includes a pair of the rising portions 26a and 26b formed at front and rear ends, and mounted on the retaining portions 25 and 25 of the lock member 6 to retain the lock member 6.

The first spring portion 27 extends from the first attaching portion 26 in the rearward direction of the vehicle. The first spring portion 27 has a spring force (urging force) to hold the lock member 6 at the lock position (the upper position) to attain the lock state.

As shown in FIG. 3, the rear end fixing portion 28b is connected to the rear end of the first spring portion 27. The rear end fixing portion 28 is fixed to first and second hole portions 37 and 38 formed in the both sides walls 17a and 17b of the upper rail 4. As described later, the rear end fixing portion 28 is configured to provide the spring force to the first spring portion 27 so as to urge the lock member 6 in the lock direction (the upward direction) in a state in which the rear end fixing portion 28 is fixed to the first and second hole portions 37 and 38.

Figure 5A:
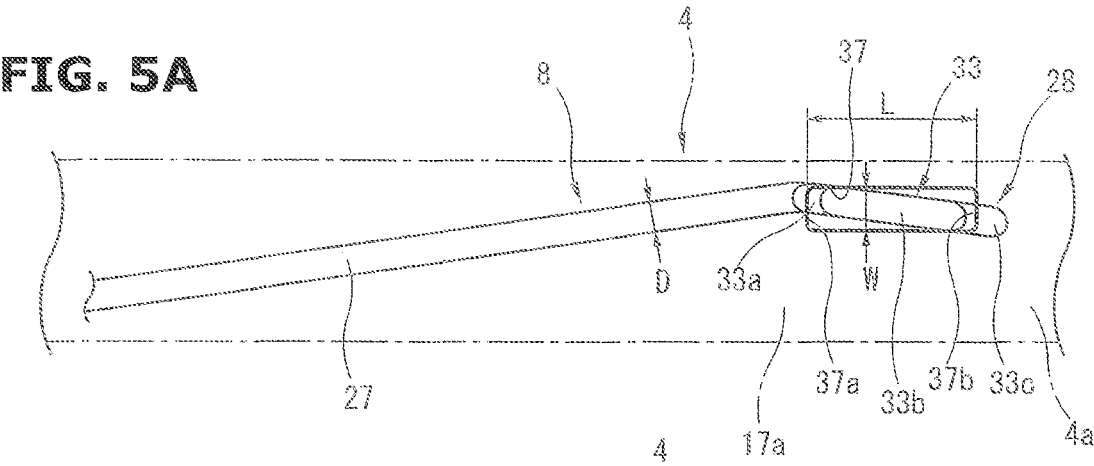
FIGS. 5A-5C are schematic views showing states in which a fixing portion of the spring member is mounted in first and second hole portions.
Figure 5B:
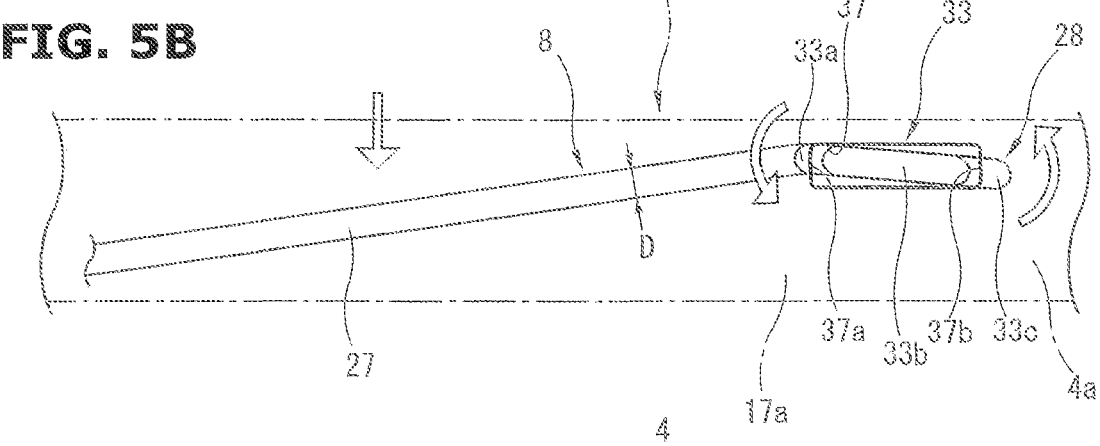
Figure 5C:
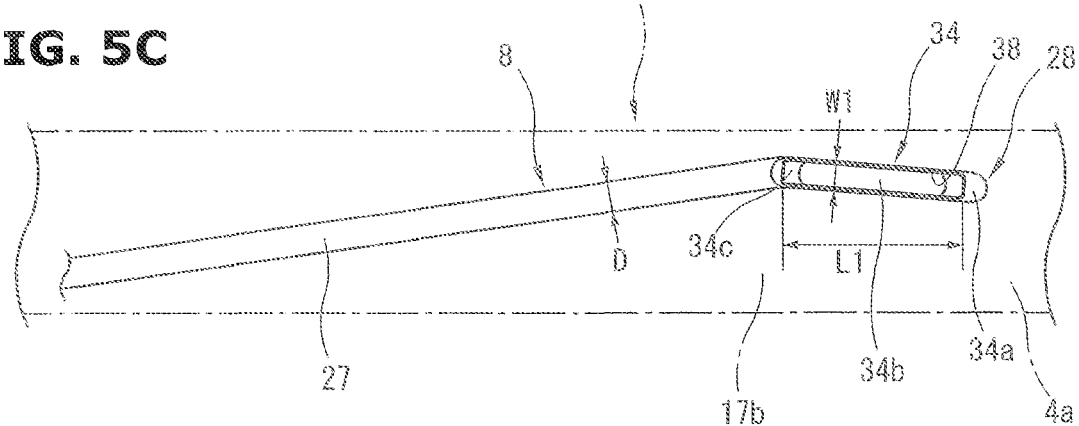

FIGS. 5A-5C are schematic views showing states in which the fixing portion (the rear end fixing portion 28) of the spring member is mounted in the first and second hole portions 37 and 38. FIG. 5A is a schematic view showing a shape of the first hole portion, and an initial state in which a portion of the first mounting portion of the fixing portion is mounted in the first hole portion. FIG. 5B is a schematic view showing a state in which the portion of the first mounting hole is finally fixed in the first hole portion. FIG. 5C is a schematic view showing a shape of the second hole portion, and a state in which a portion of the second mounting portion of the fixing portion is fixed in the second hole portion. Besides, as shown in FIG. 6B and so on, the upper rail 4 is assembled in a state where the upper rail top wall 16 is positioned on the lower side, that is, in which the upper portion is opened. Accordingly, an upper side in FIG. 5 is the opening side of the upper rail 4. A lower side in FIG. 5 is the upper rail top wall 16 side.

As shown in FIGS. 5A and 5B, FIG. 6, and FIG. 7 described later, the first hole portion 37 is disposed near the lower end wall 19a of the upper rail bent wall 19 on the rear end portion side of the upper rail first side wall 17a. Moreover, the first hole portion 37 has an elongated rectangular shape along the longitudinal direction of the upper rail. The first hole portion 37 is formed substantially parallel with the upper rail first side wall 17a. The first hole portion 37 has a width W in the upward and downward directions. The width W is greater than a diameter D of the spring member 8 (the rear end fixing portion 28). The first hole portion 37 has a length L in the longitudinal direction. The length L is longer than a length of a first linear line portion 33b of a first mounting portion 33 (described later) of the fixing portion 28.

As shown in FIG. 5C, FIG. 6, and FIG. 7, the second hole portion 38 is disposed near the lower end wall 19b of the upper rail second side wall 17b so as to confront the first hole portion 37 to be overlapped in the longitudinal direction of the upper rail, and in the upward and downward directions. The second hole portion 38 has an elongated rectangular shape along the longitudinal direction of the upper rail. As shown in FIG. 5C, the second hole portion 38 is not parallel to the upper rail second side wall 17b. The second hole portion 38 has a downward inclined shape which is downwardly inclined from the front side of the upper rail 4 toward the rear end portion 4a of the upper rail 4 at a predetermined angle. The second hole portion 38 has a width W1 in the upward and downward directions. The width W1 of the second hole portion 38 is smaller than the diameter D of the spring member 8 (the rear end fixing portion 28). The second hole portion 38 has a length L1 in the longitudinal direction. The length L1 of the second hole portion 38 is longer than a length of a second linear portion 34b of a second mounting portion 34 (described later) of the fixing portion 28. The length L1 of the second hole portion 38 is slightly longer than the length L of the first elongated hole 37 in the longitudinal direction. The second hole portion 38 has an inclination angle set to an angle which is substantially identical to an inclination angle of the first mounting portion 33 described later.

As shown in FIG. 3, the rear end fixing portion 28 has an overall ring shape bent into a polygon. In this embodiment, the rear end fixing portion 28 has a hexagonal ring shape. Besides, the rear end fixing portion 28 may have an octagonal ring shape. The rear end fixing portion 28 includes the first mounting portion 33 mounted and fixed in the first hole portion 37; and the second mounting portion 34 mounted and fixed in the second hole portion 38.

As shown in FIG. 5A, the rear end fixing portion 28 has an overall shape which includes the first mounting portion 33 and the second mounting portion 34, and which is downwardly inclined from the connection portion with the first spring portion 27 in the rearward direction at a predetermined angle. Besides, in FIG. 5, the upper rail 4 is disposed upside down, as described above. Accordingly, the upper rail top wall 16 is positioned on the lower side in FIG. 5. The opening end is positioned on the upper side in FIG. 5. Therefore, actually, the rear end fixing portion 28 is upwardly inclined from the connection portion with the first spring portion 27 in the rearward direction at the predetermined angle (to be closer to the upper rail top wall 16 side).

As shown in FIG. 3, the first mounting portion 33 has a trapezoid frame shape in a plan view. The first mounting portion 33 includes a first inclination portion 33a connected to the rear end of the first spring portion 27; a first linear portion 33b extending from an end of the first inclination portion 33a; and a second inclination portion 33c extending from an end of the first linear portion 33b.

Similarly, the second mounting portion 34 has a trapezoid frame shape in a plan view. The second mounting portion 34 includes a third inclination portion 34a extending from an end of the second inclination portion 33c; a second linear portion 34b extending from an end of the third inclination portion 34a; and a fourth inclination portion 34c extending from an end of the second linear portion 34b.

The fixing portion 28 has the hexagonal ring overall shape formed by the inclination portions 33a and 33c and the linear portion 33b constituting the trapezoid frame shape of the first mounting portion 33, and the inclination portions 34a and 34c and the linear portion 34b constituting the trapezoid frame shape of the second mounting portion 34.

A holding portion 35 is connected to the fourth inclination portion 34c. The holding portion 35 has a substantially linear shape extending substantially parallel with the first spring portion 27. The holding portion 35 is used when the second mounting portion 34 is fixed to the second hole portion 38 of the upper rail 4 by a second pushing jig 52 as described below.

As shown in FIG. 3 and FIG. 4, the second spring portion 29 extends from the first attaching portion 26 in the forward direction of the vehicle. The second spring portion 29 is bent into a curved shape. The second spring portion 29 has a spring force for holding the lock member 6 at the position (the upper position) to attain the above-described lock state. The second spring portion 29 is disposed to extend in the forward direction along the upper rail second side wall 17b. The front end fixing portion 30 is mounted and fixed in a fixing hole (not shown) formed at the front end portion of the upper rail second side wall 17b.

As shown in FIG. 3, the front end fixing portion 30 is connected to the end portion of the second spring portion 29 on the vehicle front side, and the third spring portion 31.

As shown in FIG. 3, the third spring portion 31 extends from the front end fixing portion 30 in the rearward direction of the vehicle. The third spring portion 31 has an urging force to be opened with respect to the second spring portion 29 in the leftward and rightward directions. The third spring portion 31 has a spring force by which the front end fixing portion 30 is not detached from the upper rail second side wall 17b. Moreover, the third spring portion 31 has an urging force to be opened with respect to the second spring portion 29 in the upward direction. The third spring portion 31 has a spring force to displace a rail insertion portion 40 (described later) of the operation handle 7 toward an initial position. As shown in FIG. 4, the initial position is a position at which the tip end portion 40a of the rail insertion portion 40 of the operation handle 7 is apart from the lock member 6 to bring the lock member 6 to the lock state. That is, the third spring portion 31 is configured to urge the rail insertion portion 40 in a direction opposite to a direction to release the fixing of the upper rail 4 with respect to the upper rail 3. That is, the third spring portion 31 has a spring force to hold the rail insertion portion 40 at the position for attaining the above-described lock state.

As shown in FIG. 3 and FIG. 4, the second attaching portion 32 is bent in the substantially perpendicular direction from the end portion of the third spring portion 31 on the rear end side of the vehicle to extend along the widthwise direction of the vehicle. The second attaching portion 32 is mounted to a slit 42 (described later) formed in the operation handle 7 (the rail insertion portion 40).

As shown in FIG. 2, the operation handle 7 includes a grasping portion 39 extending in the widthwise direction of the seat 2; the rail insertion portions 40 extending along the longitudinal direction of the rails 3 and 4 at both end portions of the grasping portion 39; and intermediate connection portions 41 connecting the grasping portion 39 and the rail insertion portion 40 so that the grasping portion 39, the rail insertion portion 40, and the intermediate connection portion 41 form a stepped shape. The operation handle 7 is formed into a substantially U overall shape in a plan view by bending and pressing a pipe-shaped rod having a circular section.

In the rail insertion portion 40, the second attaching portion 32 is inserted and mounted in the slit 42. With this, as shown by an arrow in FIG. 4, a spring force Fs toward the initial position is acted from the third spring portion 31 to the rail insertion portion 40. Accordingly, the rail insertion portion 40 is constantly pressed against a support protrusion portion 43 cut and raised from the upper rail top wall 16 in the downward direction.

When the grasping portion 39 is raised up in the upward direction, the tip end portion 40a of the rail insertion portion 40 is moved in the downward direction of FIG. 4 around the support protrusion portion 43 which is the fulcrum to press the lock member 6 in the downward direction to attain the lock release state.

The rail insertion portion 40 is formed by pressing the pipe-shaped rod member having the circular section into the rectangular section. The rail insertion portion 40 has an elongated hollow shape (cylindrical shape) before the pressing. The tip end portion 40a of the rail insertion portion 40 is pressed and crushed into the flat shape after the pressing. This tip end portion 40a is an end portion of the pipe-shaped rod member having the circular section. The tip end portion 40a is pressed against the lock member 6 in the above-described lock release state. The rail insertion portion 40 is inserted into the upper rail 4 to be positioned in the longitudinal direction.

As shown in FIG. 2 and FIG. 4, the slit 42 is formed to be perpendicular to the longitudinal direction of the rail insertion portion 40 (the longitudinal direction of the lower rail). The slit 42 is a hole formed by cutting a portion of the wall surfaces (the side surface and the bottom surface) of the rail insertion portion 40 by the machining, and so on. The second attaching portion 32 of the spring member 8 is mounted to the slit 42.

[Assembly Method of Spring Member (Fixing Method of Fixing Portion)]

FIGS. 6A-6D show a fixing process of mounting and fixing the first mounting portion of the fixing portion of the spring member to the first hole portion. FIG. 6A shows an initial state in which the first mounting portion is fixed to the first hole portion by using the jig. FIG. 6B is a sectional view taken along a section line A-A of FIG. 6A. FIG. 6C shows a state in which the first mounting portion is mounted in the first hole portion by using the jig. FIG. 6D is a sectional view taken along a section line B-B of FIG. 6C.

FIGS. 7A-7F show a fixing process for mounting and fixing the second mounting portion of the fixing portion to the second hole portion. FIG. 7A shows an initial state in which the second mounting portion is mounted to the second hole portion by using the jig. FIG. 7B is a sectional view taken along a section line C-C of FIG. 7A. FIG. 7C shows a state in which the second mounting portion is pushed and inserted into the second hole by using the jig. FIG. 7D is a sectional view taken along a D-D line of FIG. 7C. FIG. 7E shows a state in which the second mounting portion is mounted in the second hole portion. FIG. 7F is a sectional view taken along a section line E-E of FIG. 7E.

Figure 8:
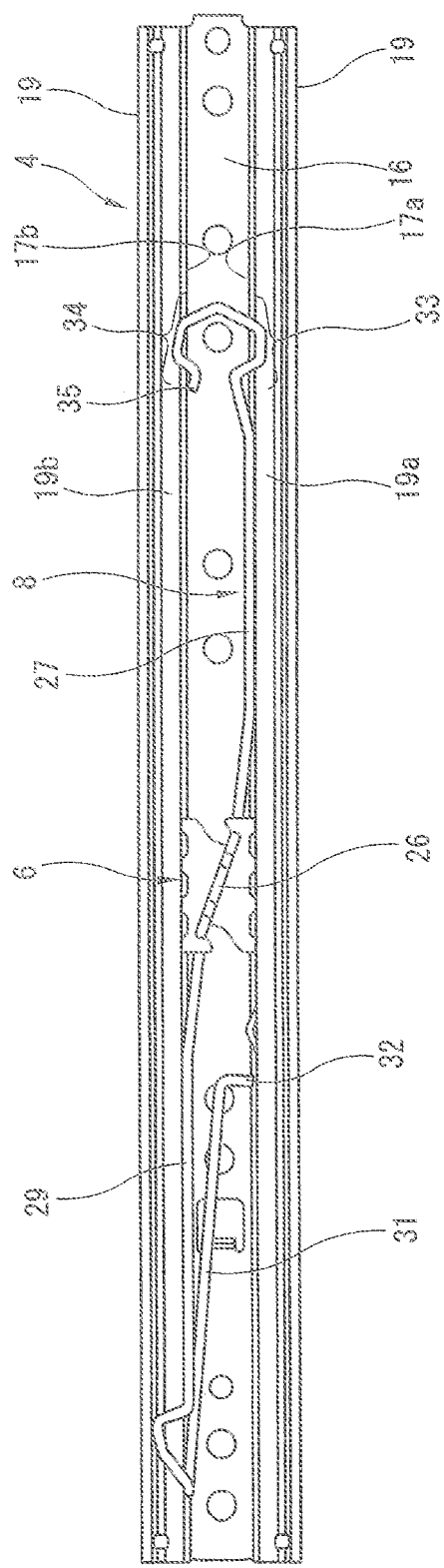
FIG. 8 is a plan view showing a main portion before the fixing portion of the spring member is fixed to the first and second hole portions of the upper rail.

FIG. 8 is a plan view showing a main portion before the fixing portion of the spring member is fixed to the first and second hole portions of the upper rail.

Figure 9:
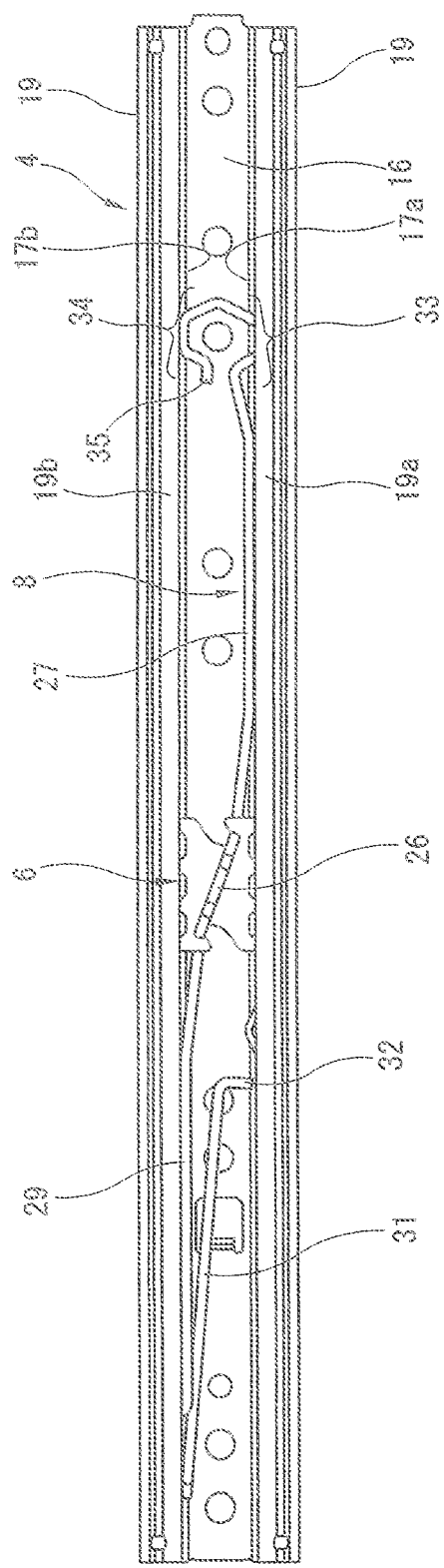
FIG. 9 is a plan view showing the main portion after the fixing portion of the spring member is fixed to the first and second hole portions of the upper rail.

FIG. 9 is a plan view showing the main portion after the fixing portion of the spring member is fixed to the first and second hole portions of the upper rail.

Hereinafter, a method (assembling method) for mounting and fixing the first mounting portion 33 and the second mounting portion 34 of the fixing portion 28 of the spring member 8 in the first hole portion 37 and the second hole portion 38 is explained with reference to FIG. 5 to FIG. 9.

Firstly, as shown in FIG. 8, the lock member 6 is disposed inside the upper rail 4 disposed upside down on a predetermined base, at the lock position at which the lock holes are inserted onto the upper rail lock teeth 20. Secondly, the spring member 8 is inserted from the upper side. In FIG. 8, the spring member 8 is rotated around the first attaching portion 26 in a clockwise direction to retain the rising portions 26a and 26b of the first attaching portion 26 to the pair of the retaining holes 25. With this, as shown in FIG. 8, the first spring portion 27 and the second spring portion 29 of the spring member 8 are disposed, respectively, along the inner surface of the upper rail first side wall 17a, and the inner surface of the upper rail second side wall 17b. Besides, in this state, the first spring portion 27 and the second spring portion 29 do not provide the spring force in the lock direction to the lock member 6 since the front and rear end fixing portions 28 and 30 are in the free state.

In this state, the first mounting portion 33 and the second mounting portion 34 of the rear end fixing portion 28 are positioned outside the opening of the upper rail 4. The first mounting portion 33 and the second mounting portion 34 of the rear end fixing portion 28 are disposed to extend above and between the lower end walls 19a and 19b (first process).

In this state in which the engagement state between the lock member 6 and the spring member 8 are maintained by the jig (not shown), a guide jig 50 and a first pushing jig 51 are abutted on the first mounting portion 33, as shown in FIG. 6A. The guide jig 50 is configured to horizontally push the first mounting portion 33 toward the second mounting portion 34. The first pushing jig 51 is configured to vertically push the first mounting portion 33 toward the upper rail top wall 16. That is, the guide jig 50 is abutted on the outer side edge of the first linear portion 33b of the first mounting portion 33 in the horizontal direction. Moreover, the first pushing jig 51 is abutted on the upper end edge of the first mounting portion 33. As shown in FIGS. 6A to 6D, the guide jig 50 has a square cross section. A flat side surface 50a of the guide jig 50 is abutted on the outer end edge of the first linear portion 33b. On the other hand, the first pushing jig 51 has a substantially rectangular cross section. A flat tip end surface 51a of the rectangular shape of the first pushing jig 51 is abutted on the upper end edge of the first mounting portion 33.

In this case, as shown in FIGS. 6A and 6B, the guide jig 50 is configured to push the first linear portion 33b of the first mounting portion 33 toward the second mounting portion 34 by the flat first side surface 50a of the guide jig 50, and to push the first linear portion 33b until the first linear portion 50a is positioned along the inner surface of the upper rail first side surface 17a.

Next, as shown in FIGS. 6C and 6D, the first pushing jig 51 pushes the upper end edge of the first mounting portion 33 in the downward direction by the flat tip end surface 51a of the first pushing jig 51. With this, the first linear portion 33b of the first mounting portion 33 is slid on the inner surface of the upper rail first side wall 17a to be moved to the first hole portion 37. With this, the first linear portion 33b is inserted and mounted into the first hole portion 37 (second process).

In this case, as shown in FIGS. 6C and 6D, in the rear end fixing portion 28, the second mounting portion 34 is maintained to be abutted on the lower end wall 19b. The first mounting portion 33 is moved in the downward direction, so that the rear end fixing portion 28 is in the inclined state. Moreover, the first spring portion 27 receives the spring force to return to a position along the upper rail first side wall 17a in the leftward and rightward directions. Accordingly, when the first mounting portion 33 confronts the first hole portion 37, the first mounting portion 33 is inserted and mounted into the first hole portion 37. In the first mounting portion 33 inserted and mounted into the first hole portion 37, as shown in FIG. 5A, an upper end edge of a part of the first inclination portion 33a is abutted on the upper surface of the first hole portion 37. A lower end edge of a part of the second inclination portion 33c is abutted on the lower surface of the first hole portion 37. Moreover, in this state, the first inclination portion 33a and the second inclination portion 33c are not abutted on the front and rear end edges of the first hole portion 37 in the forward and rearward directions of the upper rail 4.

Next, as shown in FIGS. 7A and 7B, the second pushing jig 52 is inserted from the upward and downward directions into between the holding portion 35 disposed on the upper surface of the lower end wall 19b, and the inner surface of the upper rail second side wall 17b. A tip end portion of this second pushing jig 52 is cut into a tapered inclination shape. The second pushing jig 52 includes an acute tip end edge 52a; and an inclined guide surface 52b extending from the tip end edge 52a. Firstly, the holding portion 35 is pushed in the downward direction by the inclined guide surface 52b of the second pushing jig 52, so that the second mounting portion 34 is abutted on the upper surface of the lower end wall 19b which is on the opening end side.

Next, as shown in FIGS. 7C and 7D, when the second pushing jig 52 is pushed in the downward direction, the flat back surface 52c is slid in the downward direction along the inner surface of the upper rail second side wall 17b, and the guide surface 52c pushes the holding portion 35 toward the first side wall 17a. In this case, in the rear end fixing portion 28, the second mounting portion 34 is abutted on the upper surface of the lower end wall 19b which is on the opening end side. Accordingly, the holding portion 35 is pushed toward the first mounting portion 33 side by the inclined guide surface 52d of the second pushing jig 52, so that the holding portion 35 is deformed to decrease the diameter against own elastic force in the diameter increasing direction. When the diameter of the second linear portion 34b of the second mounting portion 34 is decreased to the inner surface of the upper rail second side wall 17b, the second linear portion 34b of the second mounting portion 34 is slid in the downward direction of the drawing along the inner surface of the upper rail second side wall 17b, as shown in FIGS. 7E and 7F, and FIG. 9. Then, when the second linear portion 34b of the second mounting portion 34 is moved at a position confronting the second hole portion 38, the second linear portion 34b of the second mounting portion 34 is mounted in the second hole portion 38 by the elastic force in the diameter increasing direction (third process).

In this case, the second hole portion 38 has the upward and downward width W1 smaller than the diameter D of the second mounting portion 34. Accordingly, the second linear portion 34b of the second mounting portion 34 is engaged with inner edge portions (angular portions) of the upper and lower surfaces of the second hole portion 38. The second linear portion 34b of the second mounting portion 34 is not deeply inserted in the second hole portion 38. A part of the outer circumference portion of the second linear portion 34b of the second mounting portion 34 is shallowly inserted into the second hole portion 38. With this, the strong elastic force is acted to the first mounting portion 33 in a direction in which the first mounting portion 33 is further deeply inserted into the first hole portion.

Accordingly, as shown in FIG. 5B, in the first mounting portion 33, the first and second inclination portions 33a and 33c, and the first linear portion 33b are further deeply inserted into the first hole portion 37 by the elastic force in the diameter increasing direction of the rear end fixing portion 28, so as to be deformed into the horizontal state in accordance with the horizontal state of the first hole portion 37. Then, the first and second inclination portions 33a and 33c are abutted and fixed on the both end edges 37a and 37b of the first hole portion 37 in the longitudinal direction (cf. state of FIG. 5C and FIG. 9).

Accordingly, in the rear end fixing portion 28, the first and second mounting portions 33 and 34 which are left and right points are tightly fixed through the hole portions 37 and 38 to the both side walls 17a and 17b of the upper rail 4. Accordingly, the fixing posture position of the rear end portion of the spring member 8 in the upward and downward directions with respect to the upper rail 4 is stabilized.

As described above, when the first and second inclination portions 33a and 33c of the first mounting portion 33 are deeply inserted into the first hole portion 37, an additional torsion spring force is generated in the first spring portion 27 continuous with the first mounting portion 33 around the axis in the leftward and rightward directions.

That is, when the first mounting portion 33 inclined with respect to the first hole portion 37 formed parallel with the longitudinal direction of the upper rail is deeply inserted into the first hole portion 37, the inclined first mounting portion 33 is deformed toward the horizontal state. With this, the first spring portion 27 continuous with the first mounting portion 33 is twisted together in the counter-clockwise direction as shown by an arrow in FIG. 5B.

With this, the first spring portion 27 receives the further spring force in the downward direction as shown by the arrow in FIG. 5B, that is, an assist force, so that the strong spring force is applied to urge the lock member 6 in the lock direction. Besides, in FIG. 5B, in a state in which the first mounting portion 33 and the second mounting portion 34 are mounted in the first and second hole portions 37 and 38, the spring force to the first spring portion 27 in the downward direction of the drawing is explained. However, in a state in which the seat sliding device is mounted in the vehicle, the urging force to the first spring portion 27 is in the upward direction, that is, the spring force to urge the lock member 6 in the lock direction.

In this way, the spring member 8 is configured to provide the urging force (the assist force) in the lock direction through the hole portions 37 and 38 and the fixing portion 28 to the first spring portion 27. Accordingly, it is unnecessary to provide the spring force to the first spring portion 27 by the other manner.

That is, in the conventional art of the above-described patent document 1, it is necessary that the plurality of the support portions for supporting the intermediate portions of the first spring portion in the axial direction are provided so that the spring member provides the urging force to the lock member, and that the support portions are deformed in the shape of the arc.

However, in this embodiment, when the first mounting portion 33 is deeply inserted into the first hole portion 37, it becomes the twist state twisted around the axis of the upper rail 4 in the leftward and rightward directions. With this, the stronger spring force to urge the lock member 6 in the lock direction is generated in the first spring member 27 itself.

Accordingly, it is unnecessary to provide the plurality of the support portions for supporting the intermediate portions of the first spring 27. Consequently, it is possible to improve the manufacturing operation efficiency and the assembling operation efficiency.

Moreover, the first and second inclination portions 33a and 33c of the first mounting portion 33 are tightly abutted on the upper end edge 37a and the lower end edge 37b of the first hole portion 37 in the forward and rearward directions to restrict the movement in the upward and downward directions. Accordingly, it is possible to restrict the movement of the mounting portion 33 in the upward and downward directions, in addition to the movement in the forward and downward directions of the upper rail, and thereby to surely position the first mounting portion 33.

The second hole portion 38 is inclined in accordance with (to be aligned with) the inclination of the first mounting portion 33 mounted in the first hole portion 37. Accordingly, when the second mounting portion 34 is inserted into the second hole portion 38, the second linear portion 34b of the second mounting portion 34 is surely mounted in the second hole portion 38, so that the second mounting portion 34 is positioned, as described above.

Moreover, when the first mounting portion 33 is deeply inserted into the first hole portion 37, the first mounting portion 33 (the rear end fixing portion 28) is twisted in the counterclockwise direction to provide the spring force in the lock direction to the first spring portion 27. Accordingly, it is possible to ease the assembling operation relative to a case in which the first mounting portion 33 is largely twisted from the first.

Furthermore, the first and second mounting portions 33 and 34 can be mounted and fixed in the first and second hole portions 37 and 38 by using the spring force of the rear end fixing portion 28 in the diameter increasing direction. Accordingly, it is possible to ease the assembling operation, and thereby to attain the automatization.

Moreover, in this embodiment, the upward and downward width W1 of the second hole portion 38 is set to be smaller than the diameter D of the spring member 8. Accordingly, when the second mounting portion 34 is mounted in the second hole portion 38 in the third process, it is possible to decrease the movement amount in the leftward and rightward directions. Consequently, it is possible to deeply mount the first mounting portion 33 into the first hole portion 37 by the strong spring force of the rear end fixing portion 28 in the diameter increasing direction.

The rear end fixing portion 28 has the hexagonal ring shape. The first mounting portion 33 and the second mounting portion 34 are formed by the sides of the hexagonal shape, so that the entire shape becomes simple shape. Accordingly, it is possible to ease the molding operation, and thereby to decrease the cost.

Besides, in a case where the rear end fixing portion 28 is formed into the octagonal ring shape, the shape is simple. Accordingly, it is possible to ease the molding operation.

The first hole portion 37 and the second hole portion 38 are provided near the opening end side of the upper rail 4 in the upward and downward directions of the both side walls 17a and 17b of the upper rail 4. The rear end fixing portion 28 is mounted and fixed in the hole portions 37 and 38 from the opening end sides (the lower end wall 19a and 19b sides) of the both side walls 17a and 17b of the upper rail 4. Consequently, it is possible to ease this mounting operation.

The first mounting portion 33 and the second mounting portion 34 of the rear end fixing portion 28 can be mounted in the hole portions 37 and 38 by using the guide jig 50 and the first and second pushing jigs 51 and 52. Accordingly, it is possible to automize the assembling operation of the rear end fixing portion 28.

Moreover, the second pushing jig 52 has the two functions of the function to push the second mounting portion 34 to the inner surface of the upper rail second side wall 17b, and the function to move the second mounting portion 34 toward the second hole portion 38 along the inner surface of the upper rail second side wall 17b. Accordingly, it is unnecessary to provide another guide jig, and thereby to decrease the cost.

In particular, the holding portion 35 is provided inside the upper rail second side wall 17b. By the inclined guide surface 52b of the second pushing jig 52 configured to be moved in the upward and downward directions, it is possible to move the second mounting portion 34 toward the second hole portion 38 while decreasing the diameter of the fixing portion 28 through the holding portion 35. Accordingly, the jig needs not to be moved in the leftward and rightward directions. Consequently, it is possible to shorten the hours, and thereby to improve the assembling operation efficiency.

The present invention is not limited to the configuration of the embodiment. For example, the forming positions of the first and second hole portions 37 and 38 may be varied to arbitrary positions in the upward and downward directions of the side walls 17a and 17b. Moreover, the second hole portion 38 may be formed into a groove shape without penetrating through the upper rail second side wall 17b. Furthermore, the first hole portion 37 needs not to be parallel to the longitudinal direction of the upper rail. The first hole portion 37 may be inclined like the second hole portion 38.

Moreover, in the above-described embodiment, the first mounting portion 33 and the second mounting portion 34 are provided to the rear end fixing portion 28 of the fixing spring 8. The first mounting portion 33 and the second mounting portion 34 are mounted in the side walls 17a and 17b of the upper rail 4. However, the first mounting portion 33 and the second mounting portion 34 may be formed to the front fixing portion 30 of the fixing spring 8. The first mounting portion 33 and the second mounting portion 34 may be mounted in the side walls 17a and 17b of the upper rail 4.

Following aspects are conceivable as the seat sliding device and the assembling method of the lock spring used in the seat sliding device according to the above-described embodiment.

In one aspect, a seat sliding device includes: a lower rail disposed and fixed on a floor surface of a vehicle along frontward and rearward directions of the vehicle; an upper rail which includes a pair of side walls, which is mounted to be slid with respect to the lower rail along a longitudinal direction of the lower rail, and to which a seat is mounted; a lock member configured to be moved in upward and downward directions of a longitudinal direction of the upper rail between a lock position at which the sliding movement of the upper rail with respect to the lower rail is locked, and a lock release position at which the sliding movement of the upper rail with respect to the lower rail can be performed; a spring member disposed inside the upper rail to extend in the longitudinal direction of the upper rail, the spring member including; a first fixing portion and a second fixing portion provided at both ends of the spring member, and retained to the upper rail, an attaching portion which is provided at an intermediate portion of the spring member, and to which the lock member is retained, a first spring portion positioned between the first fixing portion and the attaching portion, and configured to urge the lock member in a lock direction; and a second spring portion positioned between the second fixing portion and the attaching portion, and configured to urge the lock member in the lock direction; and an operation lever configured to push the lock member against an urging force of the spring member, and thereby to release the lock of the upper rail, the upper rail includes a pair of left and right side walls which are a first side wall and a second side wall, and a first hole portion and a second hole portion which are formed, respectively, in the first and second side walls, and each of which extends in the longitudinal direction of the upper rail to be overlapped with each other in the longitudinal direction and upward and downward directions of the upper rail, and the first fixing portion of the spring member which has a ring shape having an outside diameter greater than a width between the pair of the side walls of the upper rail, which has a spring force in a diameter increasing direction between the pair of the side walls of the upper rail, and which includes a first mounting portion and a second mounting portion that are configured to be mounted and fixed, respectively, in the first hole portion and the second hole portion by the spring force.

In this aspect according to the present invention, the left and right two portions of the ring-shaped fixing portion which are positioned on the left and right both side wall sides are elastically mounted and fixed in the hole portions of the left and right side walls of the upper rail. Accordingly, it is possible to stabilize the fixing posture position of the fixing portion with respect to the upper rail in the upward and downward directions.

More preferably, the first hole portion has an upward and downward width greater than a spring diameter of the spring member;

the second hole portion has an upward and downward width smaller than a spring diameter of the spring member;

the first mounting portion is mounted in the first hole portion to be abutted on both ends of the first hole portion in the longitudinal direction of the upper rail;

the second mounting portion extends in parallel with an inner surface of the second side wall of the upper rail; and the second mounting portion is mounted in the second hole portion to be abutted on edge portions of the second hole portion in the upward and downward directions.

In this aspect according to the present invention, the first mounting portion is abutted on the both end portions of the first hole portion in the forward and rearward directions of the upper rail. With this, it is possible to position in the longitudinal direction of the upper rail. Moreover, the second mounting portion is inserted and mounted in the second hole portion to be abutted on the edge portions of the second hole portion in the upward and downward directions. With this, it is possible to determine the fixing position of the fixing portion with respect to the upper rail so that the fixing portion is not deviated in the upward and downward directions.

More preferably, the first fixing portion is formed into one of a hexagonal ring shape and an octagonal ring shape; and the first mounting portion and the second mounting portion are formed by sides of the one of the hexagonal shape and the octagonal shape.

In this aspect according to the present invention, the first fixing portion is formed into one of a hexagonal ring shape and an octagonal ring shape. With this, the fixing portion has the simple shape. Accordingly, it is possible to ease the molding operation, and to decrease the cost.

More preferably, the first mounting portion is mounted in the first hole portion in a state in which the first mounting portion is twisted around an axis in leftward and rightward directions of the upper rail with respect to the first spring portion; and in the mounted state of the first mounting portion, a portion of the first mounting portion on the first spring portion side is abutted on a lower surface of the first hole portion, and a portion of the first mounting portion opposite to the first spring portion is abutted on an upper surface of the first hole portion.

In the conventional art of the above-described patent document, it is necessary to provide the plurality of support portions configured to support the intermediate portions of the first spring portion in the axial direction so that the spring member provides the urging force to the lock member, and to deform the first spring portion into the arc shape. However, in this aspect according to the present invention, the first mounting portion is mounted in the first hole portion in a state in which the first mounting portion is twisted around an axis in leftward and rightward directions of the upper rail with respect to the first spring portion. Accordingly, it is possible to deform the first spring portion into the arc shape, and to strengthen the urging force to urge the lock member in the lock direction.

Moreover, the front and rear portions of the first mounting portion are abutted on the upper and lower surfaces of the first hole portion so as to restrict the movement in the upward and downward directions, in addition to the movement in the forward and rearward directions of the upper rail. With this, it is possible to surely position the first mounting portion.

More preferably, the first mounting portion is formed to be inclined with respect to the forward and rearward directions of the upper rail so that a portion of the first mounting portion on the first spring portion side is abutted on a lower surface of the first hole portion, and so that a portion of the first mounting portion opposite to the first spring portion is abutted on an upper surface of the first hole portion, when the first mounting portion is mounted in the first hole portion; and the second hole portion is formed to be inclined with respect to the forward and rearward directions of the upper rail in accordance with an inclination angle of the first mounting portion mounted in the first hole portion.

In this aspect according to the present invention, the second hole portion is inclined in accordance with the inclination angle of the first mounting portion. The second mounting portion surely mounted and positioned in the second hole portion.

More preferably, the first mounting portion includes a linear portion, and a pair of inclination portions formed at front and rear positions to sandwich the linear portion; the linear portion and the inclinations portions form a trapezoid shape; and the first fixing portion of the spring member is inclined in the upward and downward directions with respect to the first hole portion so that portions of the inclination portions are inserted into the first hole portion to be abutted on the upper and lower surfaces of the first hole portion, so that the trapezoid shape portion are not abutted on both end edges of the first hole portion in the longitudinal direction, when the trapezoid shape portion can be inserted into the first hole portion.

In this aspect according to the present invention, when the pair of the inclination portions of the first mounting portion are deeply inserted and mounted in the first hole portion, the fixing portion is mounted in the state in which the fixing portion is twisted around the axis in the leftward and rightward directions with respect to the first spring portion. With this, it is possible to add the assist force in the lock direction to the first spring portion, and to ensure and maintain the strong urging force.

More preferably, the spring member includes a holding portion provided at a tip end portion of the first fixing portion formed into the ring shape, and which extends into between the first side wall and the second side wall of the upper rail.

In this aspect according to the present invention, when the second mounting portion is mounted in the corresponding second hole portion, it is possible to mount the second mounting portion in the second hole portion while deforming the entire fixing portion to decrease the diameter by elastically deforming the second mounting portion toward the first mounting portion by using the holding portion. Accordingly, it is possible to ease the mounting operation of the fixing portion in the hole portions.

More preferably, the first hole portion and the second hole portion are formed near an opening end side of the upper rail portion in the upward and downward directions of the first side wall and the second side wall of the upper rail.

In this aspect according to the present invention, the mounting operation of the fixing portion to the hole portions is performed from the opening end side of the both side walls of the upper rail. Accordingly, it is possible to ease the mounting operation.

In another preferable aspect, the assembling method of the spring member used in the seat sliding device includes a first process of retaining the attaching portion of the spring member to the lock member disposed at the lock position with respect to the upper rail, and positioning the first fixing portion of the spring member outside an opening end side with respect to the first and second side walls of the upper rail including the first hole portion and the second hole portion in the upward and downward directions of the upper rail;

a second process of moving the first mounting portion in a direction of the first hole portion along the first side wall of the upper rail in a state in which the second mounting portion is disposed outside the second side wall of the upper rail, and mounting a portion of the first mounting portion in the first hole portion; and a third process of moving the second mounting portion along an inner surface of the second side wall of the upper rail while elastically deforming the second mounting portion of the fixing portion toward the first mounting portion, and mounting a portion of the second mounting portion in the second hole portion.

In this aspect according to the present invention, it is possible to mount and fix the first and second mounting portions in the first and second hole portions by using the spring force of the fixing portion in the diameter increasing direction. Accordingly, it is possible to ease the assembling operation. Moreover, it is possible to simplify this assembling operation, and thereby to attain the automatization.

Moreover, the upward and downward width of the second hole portion is smaller than the spring diameter of the spring member. Accordingly, when the second mounting portion is mounted in the second hole portion in the third process, it is possible to decrease the movement amount in the leftward and rightward directions. Consequently, it is possible to deeply mount the first mounting portion in the first hole portion by the strong spring force in the diameter increasing direction.

More preferably, the first fixing portion of the spring member is previously formed into an inclination shape inclined in the upward and downward directions with respect to the forward and rearward directions of the upper rail; the first mounting portion of the first fixing portion includes a linear portion, and a pair of inclination portions formed at front and rear positions to sandwich the linear portion; the linear portion and the inclinations portions form a trapezoid shape;

the second process includes moving the first mounting portion along the inner surface of the first side wall of the upper side wall so that a portion of the first mounting portion is mounted in the first hole portion, and abutting portions of the inclination portions of the first mounting portion on upper and lower surfaces of the first hole portion; and the third process includes moving the second mounting portion along the inner surface of the second side surface of the upper rail toward the second hole portion against the spring force of the fixing portion in the diameter increasing direction while the second mounting portion is elastically deformed toward the first mounting portion, and further deeply mounting the inclination portions of the first mounting portion into the first hole portion to widen a distance between the abutment positions of the upper and lower surfaces of the first hole portion, and the inclination portions to be twisted in a direction in which an inclination angle of the fixing portion with respect to the first hole portion is decreased.

In this aspect according to the present invention, when the inclination portions of the first mounting portion are further deeply mounted in the first hole portion by using the insertion of the second mounting portion into the second hole portion, the twist spring force is generated in the first mounting portion. That is, the first spring portion receives the twist spring force (the assist force) to urge the lock member in the lock direction. Accordingly, it is possible to ease the assembling operation relative to a case in which the first mounting portion is mounted in the first hole portion in a state in which the first mounting portion is largely twisted from the first.

More preferably, the second process includes disposing a guide jig continuous with the first side wall of the upper rail on the opening end side of the upper rail, pushing the first mounting portion by the guide jig in a horizontal direction to a position along the inner surface of the first side wall of the upper rail, and pushing the first mounting portion by a first pushing jig from the upward and downward directions along the inner surface of the first side wall of the upper rail so that a portion of the first mounting portion is mounted in the first hole portion; and the third process includes disposing a second pushing jig configured to be moved in the upward and downward directions along the second side walls of the upper rail, on the opening end side of the upper rail, elastically deforming the tip end portion of the fixing portion toward the first mounting portion by the second pushing jig, moving the second mounting portion along the inner surface of the second side wall of the upper rail toward the second hole portion while pushing the second mounting portion to the position along the inner surface of the second side wall of the upper rail, and mounting the second mounting portion in the second hole portion.

In this aspect according to the present invention, it is possible to mount the first mounting portion and the second mounting portion of the fixing portion in the first and second hole portions, by the respective guide jigs, and the first and second pushing jigs, and thereby to automate this assembling operation.

Moreover, the second pushing jig has the two functions of the function to move the second mounting portion toward the first mounting portion through the holding portion to push the second mounting portion to the inner surface of the second side wall, and the function to move the second mounting portion along the inner surface of the second side wall of the upper rail toward the second hole portion. Accordingly, it is unnecessary to provide another guide jig, and thereby to decrease the cost.

More preferably, the second pushing jig includes a guide surface which has an inclination shape, and which is formed at a tip end portion;

the second mounting portion includes a holding portion extending into between the first side wall and the second side walls of the upper rail; and in a state in which the second mounting portion is disposed outside the opening end of the upper rail, the guide surface is pushed and inserted into between the holding portion and the second side wall of the upper rail from the outside of the opening end to elastically deform the second mounting portion toward the first mounting portion, to move the second mounting portion along the inner surface of the second side wall of the upper rail, and to push the second mounting portion to a position at which the second mounting portion is mounted in the second hole portion.

In this aspect according to the present invention, the second pushing jig includes the inclined guide surface. With this, it is possible to move the second mounting portion toward the second hole portion while decreasing the diameter of the fixing portion, and thereby to shorten the hours.

The entire contents of Japanese Patent Application No. 2021-24756 filed Feb. 19, 2021 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat sliding device comprising:
    a lower rail disposed and fixed on a floor surface of a vehicle along frontward and rearward directions of the vehicle;
    an upper rail which includes a pair of side walls, which is mounted to be slid with respect to the lower rail along a longitudinal direction of the lower rail, and to which a seat is mounted;
    a lock member configured to be moved in upward and downward directions of a longitudinal direction of the upper rail between a lock position at which the sliding movement of the upper rail with respect to the lower rail is locked, and a lock release position at which the sliding movement of the upper rail with respect to the lower rail can be performed;
    a spring member disposed inside the upper rail to extend in the longitudinal direction of the upper rail, the spring member including;
        a first fixing portion and a second fixing portion provided at both ends of the spring member, and retained to the upper rail,
        an attaching portion which is provided at an intermediate portion of the spring member, and to which the lock member is retained,
        a first spring portion positioned between the first fixing portion and the attaching portion, and configured to urge the lock member in a lock direction, and
        a second spring portion positioned between the second fixing portion and the attaching portion, and configured to urge the lock member in the lock direction; and
    an operation lever configured to push the lock member against an urging force of the spring member, and thereby to release the lock of the upper rail,
    the upper rail includes a pair of left and right side walls which are a first side wall and a second side wall, and a first hole portion and a second hole portion which are formed, respectively, in the first and second side walls, and each of which extends in the longitudinal direction of the upper rail to be overlapped with each other in the longitudinal direction and upward and downward directions of the upper rail, and
    the first fixing portion of the spring member which has a ring shape having an outside diameter greater than a width between the pair of the side walls of the upper rail, which has a spring force in a diameter increasing direction between the pair of the side walls of the upper rail, and which includes a first mounting portion and a second mounting portion that are configured to be mounted and fixed, respectively, in the first hole portion and the second hole portion by the spring force.

2. The seat sliding device as claimed in claim 1, wherein the first hole portion has an upward and downward width greater than a spring diameter of the spring member;
    the second hole portion has an upward and downward width smaller than a spring diameter of the spring member;
    the first mounting portion is mounted in the first hole portion to be abutted on both ends of the first hole portion in the longitudinal direction of the upper rail;
    the second mounting portion extends in parallel with an inner surface of the second side wall of the upper rail; and the second mounting portion is mounted in the second hole portion to be abutted on edge portions of the second hole portion in the upward and downward directions.

3. The seat sliding device as claimed in claim 1, wherein the first fixing portion is formed into one of a hexagonal ring shape and an octagonal ring shape; and the first mounting portion and the second mounting portion are formed by sides of the one of the hexagonal shape and the octagonal shape.

4. The seat sliding device as claimed in claim 1, wherein the first mounting portion is mounted in the first hole portion in a state in which the first mounting portion is twisted around an axis in leftward and rightward directions of the upper rail with respect to the first spring portion; and in the mounted state of the first mounting portion, a portion of the first mounting portion on the first spring portion side is abutted on a lower surface of the first hole portion, and a portion of the first mounting portion opposite to the first spring portion is abutted on an upper surface of the first hole portion.

5. The seat sliding device as claimed in claim 1, wherein the first mounting portion is formed to be inclined with respect to the forward and rearward directions of the upper rail so that a portion of the first mounting portion on the first spring portion side is abutted on a lower surface of the first hole portion, and so that a portion of the first mounting portion opposite to the first spring portion is abutted on an upper surface of the first hole portion, when the first mounting portion is mounted in the first hole portion; and
    the second hole portion is formed to be inclined with respect to the forward and rearward directions of the upper rail in accordance with an inclination angle of the first mounting portion mounted in the first hole portion.

6. The seat sliding device as claimed in claim 1, wherein the first mounting portion includes a linear portion, and a pair of inclination portions formed at front and rear positions to sandwich the linear portion; the linear portion and the inclinations portions form a trapezoid shape; and
    the first fixing portion of the spring member is inclined in the upward and downward directions with respect to the first hole portion so that portions of the inclination portions are inserted into the first hole portion to be abutted on the upper and lower surfaces of the first hole portion, so that the trapezoid shape portion are not abutted on both end edges of the first hole portion in the longitudinal direction, when the trapezoid shape portion can be inserted into the first hole portion.

7. The seat sliding device as claimed in claim 1, wherein the spring member includes a holding portion provided at a tip end portion of the first fixing portion formed into the ring shape, and which extends into between the first side wall and the second side wall of the upper rail.

8. The seat sliding device as claimed in claim 1, wherein the first hole portion and the second hole portion are formed near an opening end side of the upper rail in the upward and downward directions of the first side wall and the second side wall of the upper rail.

9. An assembling method of a spring member used in a seat sliding device including a lower rail disposed and fixed on a floor surface of a vehicle along frontward and rearward directions of the vehicle; an upper rail which includes a pair of side walls, which is mounted to be slid with respect to the lower rail along a longitudinal direction of the lower rail, and to which a seat is mounted; a lock member configured to be moved in upward and downward directions of a longitudinal direction of the upper rail between a lock position at which the sliding movement of the upper rail with respect to the lower rail is locked, and a lock release position at which the sliding movement of the upper rail with respect to the lower rail can be performed; a spring member disposed inside the upper rail to extend in the longitudinal direction of the upper rail, the spring member including; a first fixing portion and a second fixing portion provided at both ends of the spring member, and retained to the upper rail, an attaching portion which is provided at an intermediate portion of the spring member, and to which the lock member is retained, a first spring portion positioned between the first fixing portion and the attaching portion, and configured to urge the lock member in a lock direction; and a second spring portion positioned between the second fixing portion and the attaching portion, and configured to urge the lock member in the lock direction; and an operation lever configured to push the lock member against an urging force of the spring member, and thereby to release the lock of the upper rail, the upper rail includes a pair of left and right side walls which are a first side wall and a second side wall, and a first hole portion and a second hole portion which are formed, respectively, in the first and second side walls, and each of which extends in the longitudinal direction of the upper rail to be overlapped with each other in the longitudinal direction and upward and downward directions of the upper rail, and the first fixing portion of the spring member which has a ring shape having an outside diameter greater than a width between the pair of the side walls of the upper rail, which has a spring force in a diameter increasing direction between the pair of the side walls of the upper rail, and which includes a first mounting portion and a second mounting portion that are configured to be mounted and fixed, respectively, in the first hole portion and the second hole portion by the spring force, the assembling method comprising:

a first process of retaining the attaching portion of the spring member to the lock member disposed at the lock position with respect to the upper rail, and positioning the first fixing portion of the spring member outside an opening so end side with respect to the first and second side walls of the upper rail including the first hole portion and the second hole portion in the upward and downward directions of the upper rail;

a second process of moving the first mounting portion in a direction of the first hole portion along the first side wall of the upper rail in a state in which the second mounting portion is disposed outside the second side wall of the upper rail, and mounting a portion of the first mounting portion in the first hole portion; and a third process of moving the second mounting portion along an inner surface of the second side wall of the upper rail while elastically deforming the second mounting portion of the fixing portion toward the first mounting portion, and mounting a portion of the second mounting portion in the second hole portion.

10. The assembling method of the lock spring as claimed in claim 9, wherein the first fixing portion of the spring member is previously formed into an inclination shape inclined in the upward and downward directions with respect to the forward and rearward directions of the upper rail; the first mounting portion of the first fixing portion includes a linear portion, and a pair of inclination portions formed at front and rear positions to sandwich the linear portion; the linear portion and the inclinations portions form a trapezoid shape;

the second process includes moving the first mounting portion along the inner surface of the first side wall of the upper side wall so that a portion of the first mounting portion is mounted in the first hole portion, and abutting portions of the inclination portions of the first mounting portion on upper and lower surfaces of the first hole portion; and the third process includes moving the second mounting portion along the inner surface of the second side surface of the upper rail toward the second hole portion against the spring force of the fixing portion in the diameter increasing direction while the second mounting portion is elastically deformed toward the first mounting portion, and further deeply mounting the inclination portions of the first mounting portion into the first hole portion to widen a distance between the abutment positions of the upper and lower surfaces of the first hole portion, and the inclination portions to be twisted in a direction in which an inclination angle of the fixing portion with respect to the first hole portion is decreased.

11. The assembling method of the lock spring as claimed in claim 9, wherein the second process includes disposing a guide jig continuous with the first side wall of the upper rail on the opening end side of the upper rail, pushing the first mounting portion by the guide jig in a horizontal direction to a position along the inner surface of the first side wall of the upper rail, and pushing the first mounting portion by a first pushing jig from the upward and downward directions along the inner surface of the first side wall of the upper rail so that a portion of the first mounting portion is mounted in the first hole portion; and the third process includes disposing a second pushing jig configured to be moved in the upward and downward directions along the second side walls of the upper rail, on the opening end side of the upper rail, elastically deforming the tip end portion of the fixing portion toward the first mounting portion by the second pushing jig, moving the second mounting portion along the inner surface of the second side wall of the upper rail toward the second hole portion while pushing the second mounting portion to the position along the inner surface of the second side wall of the upper rail, and mounting the second mounting portion in the second hole portion.

12. The assembling method of the lock spring as claimed in claim 11, wherein the second pushing jig includes a guide surface which has an inclination shape, and which is formed at a tip end portion;

the second mounting portion includes a holding portion extending into between the first side wall and the second side walls of the upper rail; and in a state in which the second mounting portion is disposed outside the opening end of the upper rail, the guide surface is pushed and inserted into between the holding portion and the second side wall of the upper rail from the outside of the opening end to elastically deform the second mounting portion toward the first mounting portion, to move the second mounting portion along the inner surface of the second side wall of the upper rail, and to push the second mounting portion to a position at which the second mounting portion is mounted in the second hole portion.

* * * * *